United States Patent Office.

GEORGE W. FLOWERS, JACOB C. HAPPERSETT, AND DANIEL W. HAPPERSETT, OF URBANA, OHIO.

Letters Patent No. 74,756, dated February 25, 1868.

IMPROVED BURNING-FLUID.

The Schedule referred to in these Letters Patent and making part of the same.

TO ALL WHOM IT MAY CONCERN:

Be it known that we, GEORGE W. FLOWERS, JACOB C. HAPPERSETT, and DANIEL W. HAPPERSETT, of Urbana, Champaign county, in the State of Ohio, have invented a new and improved Burning-Fluid, which we call "The Excelsior Illuminator;" and we do hereby declare that the following is a full and exact description thereof.

The Excelsior Illuminator is composed of gasoline, chloride of sodium, iodine, and quicklime, and is compounded as follows: Take one part of chloride of sodium to two parts of quicklime, and add iodine to give coloring. Put in a sufficient quantity of gasoline to distill the compound; then add five parts of gasoline to one of the distillation, when it is ready for use.

The compound herein described makes a beautiful, clear, and steady light, and can be manufactured for from fifteen to twenty cents per gallon. We do not limit ourselves to the portions in which said ingredients may be compounded to produce similar effects, but they may vary.

What we claim, and desire to secure by Letters Patent of the United States, is—

The fluid prepared of the materials and substances as herein described.

GEORGE W. FLOWERS,
JACOB C. HAPPERSETT,
DANIEL W. HAPPERSETT.

Witnesses:
  J. A. EDMONDS,
  JOHN C. SAWYER.